Dec. 27, 1938.   P. J. HARRINGTON   2,141,297
PROCESS FOR RECOVERING OIL FROM PETROLEUM ACID SLUDGE
Filed Dec. 11, 1934
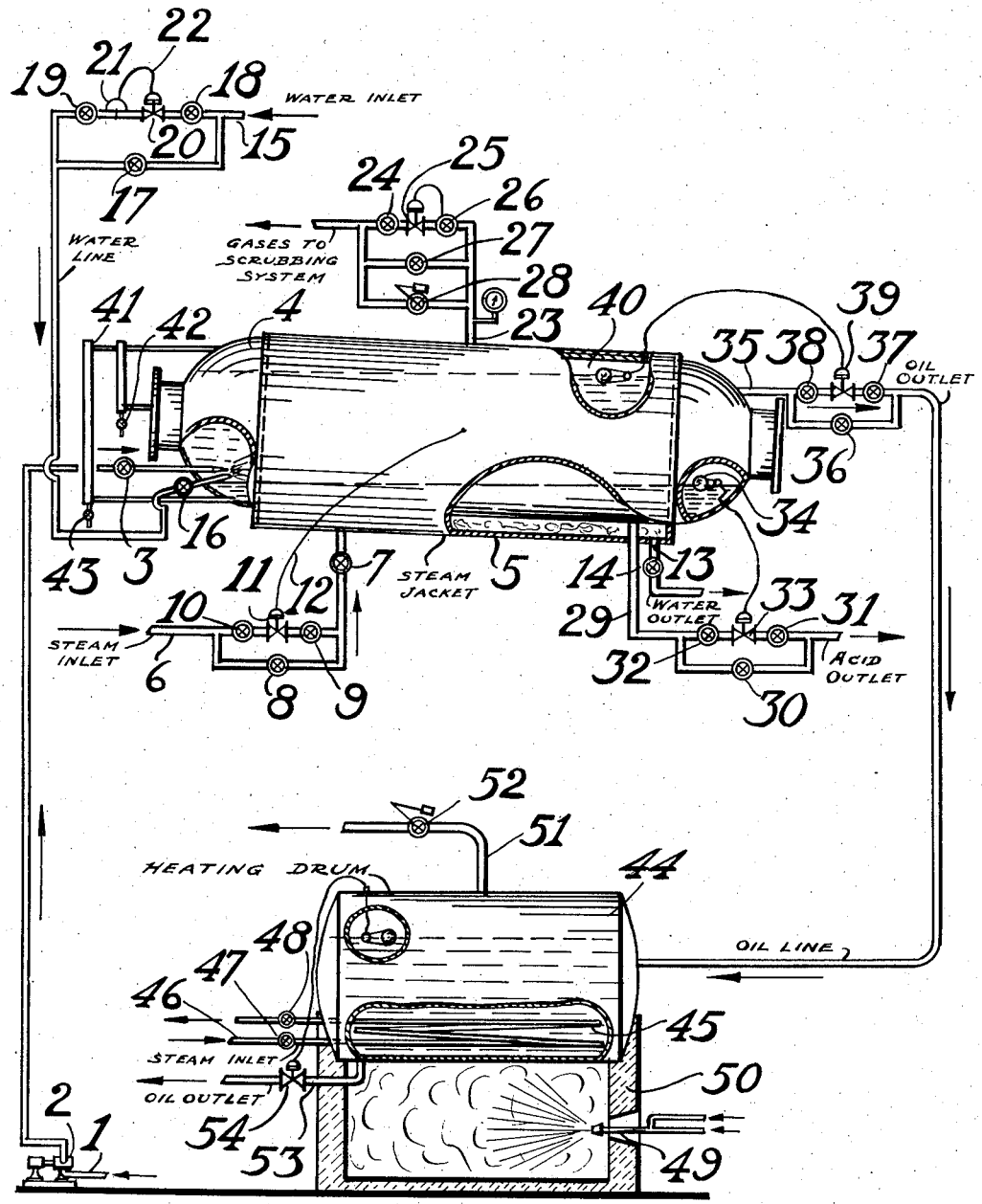
Paul J. Harrington Inventor
By W. E. Currie Attorney Patented Dec. 27, 1938

2,141,297

UNITED STATES PATENT OFFICE 2,141,297

PROCESS FOR RECOVERING OIL FROM PETROLEUM ACID SLUDGE

Paul J. Harrington, Fanwood, N. J., assignor to Standard Oil Development Company, a corporation of Delaware Application December 11, 1934, Serial No. 756,956

4 Claims. (Cl. 196—148)

This invention relates to a method of treating the separated tar produced from the separation of acid sludge originating from the treating of petroleum oils with sulfuric acid which results in the production of a dry, acid-free separated oil and sulfur dioxide which may be converted into sulfuric acid.

Petroleum oils or distillates all contain more or less of those constituents known as unsaturated, aromatic, and sulfur compounds. These constituents are frequently removed either partly or entirely in the refining of petroleum oils. In such refinery processes, petroleum oils are often treated with sulfuric acid. The undesirable compounds dissolve in and react with the acid producing an acid sludge which precipitates and is separated from the residual oil. This sludge contains a relatively large amount of sulfuric acid as well as hydrocarbon compounds and products formed by the interaction of acid and hydrocarbons. It is customary and of distinct economic advantage to recover as much of the acid as possible for reuse, producing at the same time a fuel, the value of which increases with decreasing acid content.

In the art of sludge processing, several procedures are known. The sludge may be heated to decompose the acid present with the formation of $SO_2$ which may be converted into sulfuric acid by well known methods. In case the acid content of the sludge is high, a dry, coked residual fuel is produced. With low acid content sludges or high acid content sludges to which fluxing oils have been added before decomposition, a liquid fuel residue may be produced.

The older method of sludge processing consists of adding sludge and hot water to an agitator, agitating to a greater or lesser degree, settling, and withdrawing so-called weak acid and separated tar and oil. The dilution method was improved by mixing sludge, hot water and steam in a mixing column and allowing the mixture to settle in a drum or other vessel, whence separated oil and weak acid could be withdrawn. This system provided continuous operation. In another improvement on the dilution process described in previous co-pending application Serial No. 704,088 filed December 27, 1933, by Chester L. Read and Paul J. Harrington, sludge and water are separately flowed into a steam-jacketed reaction vessel from which separated oil and weak acid are continuously withdrawn. The external heating and the lack of vigorous mixing of sludge and water greatly lessen emulsion formation and result in increased acid recovery and better separated oil quality.

The proportion of the acid available in the sludge which may be recovered by the dilution processes and the proportion of that acid which is not recovered but remains in the separated oil in the form of emulsified or suspended weak acid varies with the type of sludge processed, the type of separation process employed, and the conditions of temperature, pressure, reaction and separation time, and weak acid strength employed. It is believed that the process described in the co-pending application Serial No. 704,088 results in the highest acid recoveries and the best quality separated oil, but all commercial separated oils resulting from sludge dilutions contain definite amounts of weak acid. Thus, for example, the separated oil from a certain naphtha distillate acid sludge processed by the batch dilution method described above contains 12% by weight $H_2SO_4$ in the form of 30° Bé. weak acid and the oil obtained in the Read and Harrington process mentioned above contains only 2% by weight $H_2SO_4$ in the form of weak acid. The acid lost in the separated oil is not only useful acid lost but also lowers the useful fuel content of the separated oil and necessitates a separate, expensive, corrosion-resisting system to handle and burn the separated oil.

It has been found that if separated oil derived from the separation by dilution of acid sludge originating in the treatment of petroleum oils with sulfuric acid and containing sulfuric acid in the form of weak acid is heated to a sufficient temperature for a sufficient time the weak acid will be concentrated and decomposed to form $SO_2$ and $H_2O$. These gases may be removed and the $SO_2$ used to produce sulfuric acid, thus increasing the acid recovery on the original sludge. In any case the separated oil is freed of water and acid so that not only is its fuel value increased but it may be mixed and handled with ordinary fuels in systems not especially designed to prevent corrosion by acid.

It is evident that the amount of acid contained in the separated oil to be processed will depend upon the method of separation of sludge used and while this separated oil purification process is primarily designed to be used in conjunction with the above process of sludge separation it is equally applicable to separated oils from any process for the separation of sludge by dilution. Whereas the separated tar from the Read and Harrington process commonly contains from 1 to 5% by weight of $H_2SO_4$ as 20 to 50° Bé. weak acid, separated oils may be chosen for processing containing up to 15% by weight of $H_2SO_4$ as weak acid.

The reaction which results in the decomposition of the acid is accompanied by a dehydrogenation of the hydrocarbons in the separated oils. The degree to which this dehydrogenation can proceed before the residual separated oil is coked depends upon the nature of the petroleum oil treated and upon the treating and sludge separating conditions. It is my purpose to add to those separated oils to be processed, which contain sufficient $H_2SO_4$ to cause them to coke up during normal processing, sufficient petroleum blending oils, such as fuel oil or gas oil, to prevent coking or processing and effect the production of a liquid fuel upon decomposition of the acid from the separated oil.

The temperature to which separated oil or a mixture of such oil and a petroleum fluxing oil must be heated and the time during which the oils must be held at temperature to effect the decomposition of the acid therein will depend upon the nature of the original petroleum distillate acid treated, the conditions of acid treating and sludge separation employed. Commonly the temperature necessary will not exceed 500° F. and the time 3 hours but frequently a much shorter time and lower temperature will suffice.

Pressure may be maintained on the reaction vessel to the extent of 200 pounds per square inch or less to prevent too great a loss of hydrocarbons by distillation while the water vapor and $SO_2$ resulting from the decomposition of acid are removed from the system under pressure. A pressure of not less than 25 pounds per square inch is not desirable.

This invention will be more readily understood by reference to the accompanying drawing which illustrates diagrammatically an apparatus in which a preferred embodiment of the invention can be economically performed.

Referring to the drawing, pipe 1 provided with pump 2 and valve 3 is used to pass sludge into settling drum 4. The settling drum 4 is provided with a suitably insulated steam jacket 5 into which steam is passed through pipe 6 provided with valves 7, 8, 9, 10 and 11. Valve 11 is regulated by temperature control 12 so that any desired temperature may be maintained in the steam jacket. Steam jacket 5 also has a drain pipe 13 provided with valve 14 through which any water condensed in the jacket may be removed. Pipe 15 provided with valves 16, 17, 18, 19, 20 and 21 is used to pass water into the settling drum 4. The rate of flow controller 22 is provided which is connected to valves 20 and 21. The water and sludge both enter settling drum 4 at a lower part of the drum and the outlets are so arranged that the sludge flows over the body of water entering into the settling drum 4. This mixture of water and sludge on entering the settling drum 4 is heated to temperatures below 280° F. so that polymerization of oily materials is greatly reduced. The heating is accomplished by means of the steam jacket 5 and a gradual separation of weak sulfuric acid takes place.

Vapors or gases are evolved from the sludge and water mixture upon the increase of temperature. The gases are removed through line 23 provided with valves 24, 25, 26, 27, and 28. The gases are passed to a scrubbing system where the liquid hydrocarbons are recovered and the gaseous hydrocarbons passed to the gas line. The pressure in the settling drum is regulated by means of pressure relief valve 28 and at no time is the pressure allowed to exceed 25 pounds per square inch. The settling drum 4 is slightly elevated at the end where the sludge and water are passed into it. At the opposite end, an acid line 29 provided with valves 30, 31, 32 and 33 is used to drain the weak acid from the settling drum. The rate of flow of the acid through line 29 is regulated by a duo-gravity float liquid level control 34 acting on air operated valve 33. An oil line 35 provided with valves 36, 37, 38 and 39 is used to remove the separated oil from the settling drum to a drum 44. The rate of flow of the separated oil is regulated by a duo-gravity float liquid level control 40 operating in conjunction with air operated valve 39. Settling drum 4 may be provided if desired with a gauge glass 41 provided with valves 42 and 43 to indicate the level of the liquids. The drum 44 has a heating coil 45 through which steam or hot oil may be circulated by means of inlet 46 provided with valve 47 and outlet 48. Other means of heating drum 44 are provided such as burner 49 and furnace setting 50. Pipe 51 provided with a pressure control valve 52 and pipe 53 provided with a liquid level valve 54 are used as vapor and oil outlets respectively.

In the operation of this process the sludge and water are passed through the settling drum, the oil flowing over a stream of water entering the settling drum. The oil readily separates from the weak acid but the weak acid separates more slowly from the oily layer in the settling drum. This makes it advantageous to have a thick layer of oil in the settling drum relative to the thickness of the weak acid layer to produce the acid-free oil and high acid recovery that is obtained by this process. This method of flowing sludge and water together in the externally heated settling drum and the provision of the extended settling time eliminate the necessity for maintaining high temperatures in order to produce clean acid. It has been found advantageous to remove the oily layer before it is substantially free of the sulfuric acid and pass it into a separate heating drum. Generally, the separated oil and tar contain from 2 or 3% to as high as 25% sulfuric acid in the form of weak acid which is emulsified to such a degree that it does not readily separate without standing a considerable length of time. On heating in the heating drum, the acid is first concentrated, that is, water is driven off and then decomposed, yielding an acid-free dry oil or tar. Sulfur dioxide gas is formed on the decomposition of the acid and may be reconverted into sulfuric acid by any of the well known methods.

For example, a separated oil or tar containing 8.67% by weight of 30° Baumé gravity sulfuric acid and 91.33% by weight of oil, upon heating in a closed lead lined heating vessel to a temperature of from 150° to 450° F. at a pressure sufficient to prevent too vigorous boiling or foaming, may be decomposed into dry oil, water and sulfur dioxide.

The concentration and the decomposition of the acid in the separated oil or tar will result in a fuel which is more valuable because it is dry and acid-free and therefore has a high heating value and need not be handled in acid-resisting fuel storage and burning equipment.

The foregoing description is merely illustrative and various changes and alternative arrangements may be made within the scope of the appended claims in which it is my intention to claim all novelty as broadly as the prior art permits.

I claim:

1. In a process of treating petroleum oil containing residual sulphuric acid and obtained from an acid sludge, by means of heat treatment with water, the step which comprises subjecting the separated oil to an elevated temperature of from 150° to 450° F. and a superatmospheric pressure of not less than 25 pounds per square inch and separately withdrawing water vapor, sulfur dioxide gas and oil.

2. In a process of treating an oil separated from an acid sludge, resulting from the treating of petroleum oil with sulfuric acid by means of heat treatment with water, the step which comprises subjecting the separated petroleum oil to an elevated temperature of from 150° to 450° F. and a superatmospheric pressure of 25 to 200 pounds per square inch and separately withdrawing water vapor, sulfur dioxide gas and oil.

3. In a process of treating acid sludge resulting from the refining of petroleum with sulfuric acid, the step which comprises flowing water into a chamber, flowing the sludge over and in contact with the body of water passing into said chamber, maintaining an elevated temperature not above 280° F., maintaining an elevated pressure not above 25 pounds per square inch, separately withdrawing fram said chamber weak acid and oil containing a small percentage of acid and gases, subjecting the separated oil containing a small percentage of acid to an elevated temperature of 150° to 450° F. and a superatmospheric pressure of 25 to 200 pounds per square inch and separately withdrawing vapor comprising water vapor and sulfur dioxide and oil.

4. In a process for recovering oil from petroleum acid sludges, the steps of adding water to the sludge and hydrolyzing the same so as to produce a relatively clean dilute acid and an acid oil containing a small amount of dilute acid, separately withdrawing the acid and the acid oil, heating the latter to an elevated temperature of the order of 150 to 450° F. and at a superatmospheric pressure between about 25 and 200 pounds per square inch, whereby the acid is decomposed, removing water vapor and sulfur dioxide and separately withdrawing the purified oil.

PAUL J. HARRINGTON.